United States Patent

Fuller et al.

[11] Patent Number: 5,719,945
[45] Date of Patent: Feb. 17, 1998

[54] ACTIVE FOAM FOR NOISE AND VIBRATION CONTROL

[75] Inventors: Christopher R. Fuller; Craig A. Rogers; Chen Liang, all of Blacksburg, Va.

[73] Assignee: Noise Cancellation Technologies, Inc., Linthicum, Md.

[21] Appl. No.: 568,443

[22] Filed: Dec. 7, 1995

Related U.S. Application Data

[63] Continuation of Ser. No. 104,754, Aug. 12, 1993, abandoned.

[51] Int. Cl.[6] ............................................. A61F 11/06
[52] U.S. Cl. .............................................. 381/71.2
[58] Field of Search ........................ 381/94, 71, 152, 381/158, 190; 310/367, 326, 327, 328, 322, 333; 29/25.35, 540; 181/206

[56] References Cited

U.S. PATENT DOCUMENTS

| | | | |
|---|---|---|---|
| 4,056,742 | 11/1977 | Tibbetts | 310/367 |
| 4,322,877 | 4/1982 | Taylor | 29/25.32 |
| 4,565,940 | 1/1986 | Hubbard, Jr. | 310/322 |
| 4,954,781 | 9/1990 | Hirata | 324/318 |
| 5,091,953 | 2/1992 | Tretter . | |
| 5,115,472 | 5/1992 | Park et al. | 381/152 |
| 5,142,511 | 8/1992 | Kanai et al. | 310/358 |

Primary Examiner—Curtis Kuntz
Assistant Examiner—Ping W. Lee

[57] ABSTRACT

An active foam system for noise and vibration control which employs embedded PVDF layers (12) in a urethane foam pad (13). The system can be used to isolate and/or attenuate vibration. It can also be used to cause a reduction in far-field acoustic pressure and to act as a structurally radiated speaker (130).

14 Claims, 13 Drawing Sheets

FIG.10
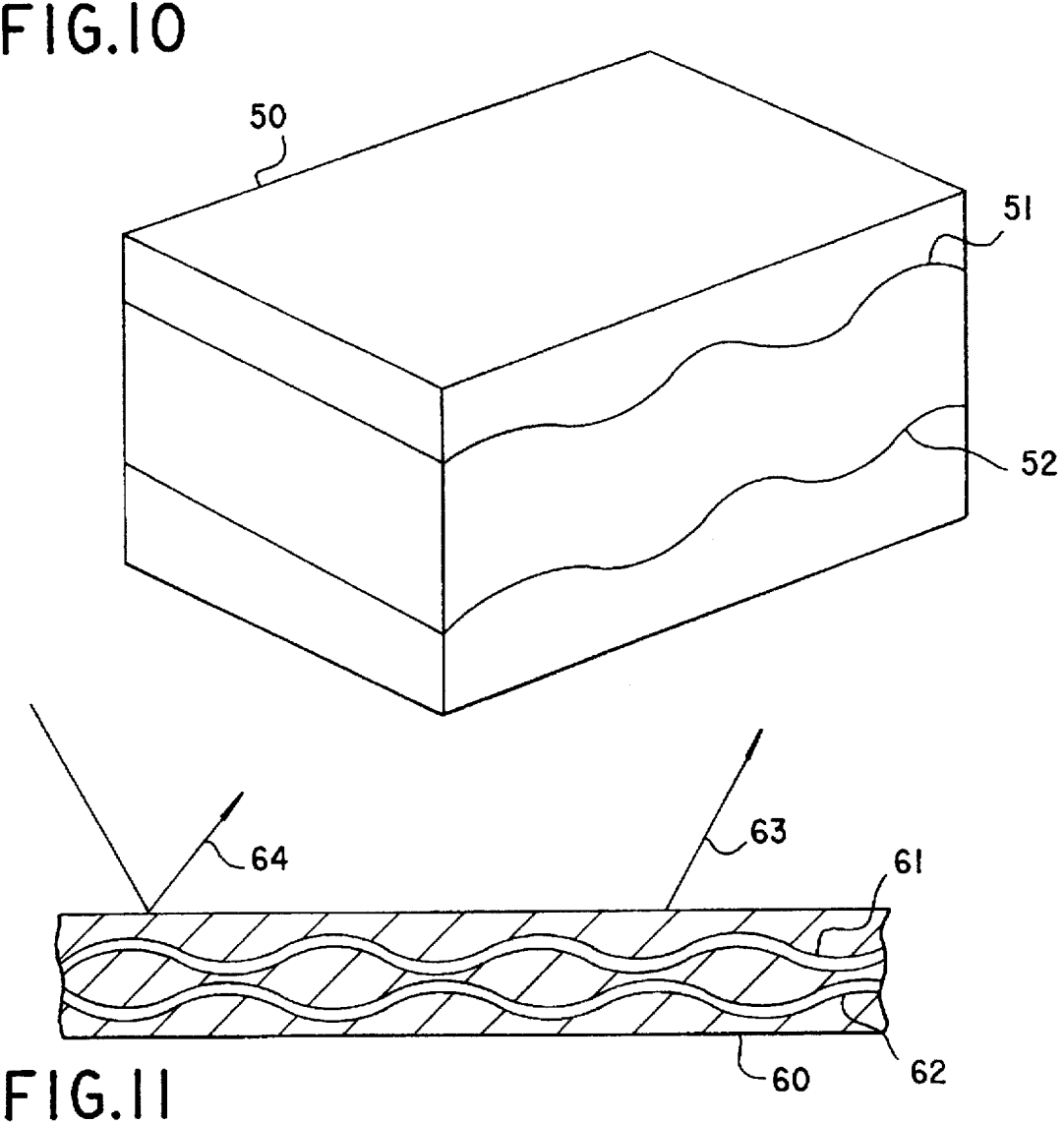
FIG.11
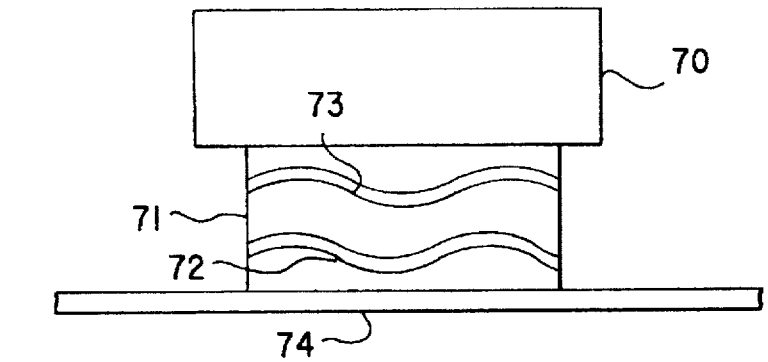
FIG.12

ACTIVE FOAM FOR NOISE AND VIBRATION CONTROL

This is a Continuation of application Ser. No. 08/104,754, filed on Aug. 12, 1993, now abandoned.

This invention is directed to the creation of an active noise and vibration canceling foam which contains layers of embedded curved PVDF (polyvinyleidene fluoride) piezoelectric materials.

BACKGROUND

To attenuate low frequency sound and vibration one requires very thick layers of foam damping and isolation material. The present invention consists of foam with embedded layers of PVDF arranged in various patterns to activate and change the properties of the foam. The PVDF is electronically activated.

Earlier work with PVDF was done by Tibbetts and shown and described in U.S. Pat. No. 4,056,742. Tibbetts was concerned with creating a transducer and placed a rippled cylindrical segment sheet of PVDF on a rigid frame. The purpose is to achieve a useful elastic stability to the film and cancel harmonic distortion.

Sound and vibration can be attenuated by layers of attached foam. However, the success has been limited and has resulted in thick layers of insulating materials to attenuate undesired noise particularly at low frequencies. In the instant invention, the thin layer can be used to control sound radiation, in sound absorption and in sound control and also vibration isolation. The foam that forms the subject matter of this invention utilizes curved layers of embedded PVDF piezoelectric materials. (The PVDF is electrically activated with time varying signals and used to adapt the properties of the foam in terms of vibration isolation and sound radiation and absorption). The curved PVDF couples better to out-of plane motion than straight or planar PVDF. The foam itself is urethane but can be of another similar material.

GENERAL DESCRIPTION

When an oscillating voltage is applied to PVDF it causes the material to dominantly strain in plane. Curving the PVDF causes the in-plane motion to couple to out-of-plane motion. Thus by embedding the curved PVDF in foam the acoustic and vibrational characteristics of the foam can be modified. In particular, the low frequency damping characteristics of the foam can be improved leading to a much more compact implementation of the foam. By varying the configuration of the PVDF in the foam the PVDF can also be made to act like a distributed loudspeaker where the foam acts as a support matrix.

Four possible applications of the active foam and of the proposed distributed PVDF actuators are (i) active structural radiation and control, (ii) distributed speakers for special sound effects, (iii) active sound reflection control and, (iv) active damping and vibration isolation. A large piece of active foam may be bonded to the surface of a vibrating structure, for example a vibrating plate. The active foam can then be activated to generate a sound which has a 180° phase angle between the sound radiated from the plate in the error plane. The near field acoustic interaction (or cancellation) will result in a reduction in the far-field acoustic pressure. The application of the distributed PVDF actuators or active foam as a special distributed speaker would be manifested by applying very large curved PVDF sheets mounted on the surface of the foam to a wall or laminating it in wall paper to create very large thin speakers. The application of distributed PVDF actuators in active sound reflection control can be illustrated by considering an incident sound wave to a flat surface covered with the active foam. First, the foam has a much lower reflection coefficient which tends to reduce the sound reflection; and second, the activation of the active foam will generate a sound to cancel the reflected sound wave resulting in little or no sound reflection.

The active foam can also be used for vibration damping or isolation. In the case of vibration damping, the active foam is attached to the structural surface and activated to damp out the motion of the structure. For active isolation the vibrating machine is mounted on active foam blocks. The electrical inputs to the PVDF are adjusted by a controller to minimize the vibration transmission from the machine to the receiving base.

Theoretical and experimental analysis have been conducted to study the characteristics of sound radiation from curved PVDF actuators as acoustic speakers. The important conclusions drawn from theoretical analysis are:

The sound radiation of PVDF acoustic actuators can be as high as 120 dB in certain frequency ranges for a given voltage depending on the configuration of the acoustic actuators, namely the size of the actuator, curvature, and actuator thickness. I.e., PVDF actuators can radiate significant sound.

Since PVDF is extremely flexible, fluid coupling is an important factor in designing the PVDF acoustic actuators. For example, considering an infinite length PVDF cylinder, increasing the radius of the cylinder results in decreasing of the rigidity of the cylinder; therefore requiring consideration of fluid interaction in order to determine the sound radiation of the cylinder. However, it is found that if the radius of curvature is less than 10 mm, it is not necessary to consider the fluid coupling within the audio frequency range. This also implies that when the dynamics of the active foam is modeled then the coupling between the foam and PVDF has been taken into account.

Experimental investigation has been conducted to measure the sound radiated from PVDF actuators. Its results have indicated the feasibility of using curved PVDF as a sound source.

The process of curving the PVDF is as follows. Glue or a similar adhesive is first placed on the mounting structure. The ends of the PVDF are attached to the structure. The distance between the ends is dependent on how many structural curves are curved between, as well as the curvature of these structure waves. One of the actuators can have one curve, and the other may have two. One curve can be formed by simply bonding both ends to the supporting structure. Two curves may be formed by pressing the center of a large curve down on the structure and securing it. More curves can be created in the same way by splitting one bigger curve into two smaller ones.

Conclusions drawn from experiments are:

Significant sound can be radiated from the curved PVDF acoustic actuators.

The frequency response depends highly on the actuator configuration, such as the number of waves and the curvatures of the waves.

Plain PVDF does not radiate sound efficiently. Reinforcing the plain PVDF actuators with plastic layers dramatically increases their sound radiation capability.

To provide a more advanced implementation of the PVDF based active foam various curvatures and arrangements of the foam are first determined as above described. The PVDF is then embedded in the foam by cutting the foam in appropriate layers and shapes to match the PVDF. The PVDF is then bonded to the foam and the layers of foam are then rejoined to construct a PVDF/foam composite. Multiple layers of PVDF are possible and the PVDF can also be used as a sensor for the control approach. In such a configuration not only does the foam provide a support matrix for the use of the PVDF as a speaker but the PVDF is used to actively change the properties of the foam so that its absorption and isolation characteristics can be altered.

Accordingly, it is an object of this invention to provide an effective noise and vibration attenuating and/or isolating foam.

Another object of this invention is to provide an active acoustic foam which causes a reduction in far-field acoustic pressure.

A further object of this invention is to use PVDF embedded foam as a vibration isolation means.

A still further object of this invention is to use PVDF embedded foam as a structurally radiated speaker.

Yet another object of this invention is to employ foam embedded with PVDF for vibration damping.

Another object is to provide an acoustic foam with curved embedded PVDF actuators.

An additional object of this invention is the provision of distributed PVDF actuators in active sound reflection control.

These and other objects will become apparent when reference is had to the accompanying drawings in which FIG. 1 is a cut-away perspective of active structural acoustic control (ASAC) with active foam, FIG. 2 is a graph showing optimization of curved PVDF actuator configuration for ASAC, FIG. 3 is a graph plot of acoustic intensity versus frequency showing a comparison of coupled and de-coupled acoustic analysis, FIG. 4 is a graph of acoustic intensity versus frequency for underwater ASAC with curved PVDF actuators, FIG. 5 is a plot of acoustic pressure versus radial distance from the PVDF cylinder, FIG. 6 is a plot of acoustic pressure versus voltage, FIG. 7 is a plot of acoustic intensity versus frequency for various thicknesses of PVDF actuators, FIG. 8 is a plot of sound level from a PVDF ring versus frequency, FIG. 9 is a plot of sound level versus frequency for curved PVDF acoustic actuators, FIG. 10 is a perspective view of a representative active foam, FIG. 11 is a sectional view of a foam with curved embedded piezoelectric material, FIG. 12 is a side view of an application of the foam comprising this invention, FIG. 13 is a block diagram of the standing wave tube system used to determine the frequency response of active foam constituted according to this invention, and to study its importance in active reflection control, FIG. 14 is a chart showing the frequency response function of active foam, FIG. 15 is a diagrammatic view of the foam and PVDF of this invention used as a speaker surface, and FIG. 16 shows the instant invention being used as a frequency vibration damper.

DETAILED DESCRIPTION

Active sound attenuation (ASA) refers to the technique where one sound is used to cancel another sound if the control sound has an out-of-phase acoustic pressure with respect to the sound to be controlled. ASA was first discussed in 1934 by Lueg and since then has attracted many researchers. However, in the early days of ASA research, its success was limited by the electronic techniques and hardware available. With the development of sophisticated electronic systems in the 1970's, active structural acoustic control (ASAC) of large scale structures, such as airplane fuselage became possible with ASA.

Conventional ASA technique utilizes speakers as control sound sources, such as the type of system proposed by Lueg in 1934. The geometry and size of these control speakers affect the control authority of ASA significantly. For example, the sound from a vibrating structure may be reduced, in some degree, everywhere in the far-field as long as the control source is smaller than the wavelength of the sound and is located close to the structure at a distance of about $\lambda/3$ to $\lambda/4$ (Warnaka, 1982). ASA is also sensitive to the frequency of sound, i.e., it is difficult to conduct broadband noise control unless the control speaker system is made adaptive. Another question associated with the conventional ASA is that the control speakers are discretized and can produce "quiet spots" in the acoustic field while the overall far-field sound reduction may not be very significant. Therefore, many speakers are needed in order to control a large acoustic field. With these issues in mind, a new system of ASA with curved distributed PVDF actuators embedded in foam is proposed herein.

Figure 1:
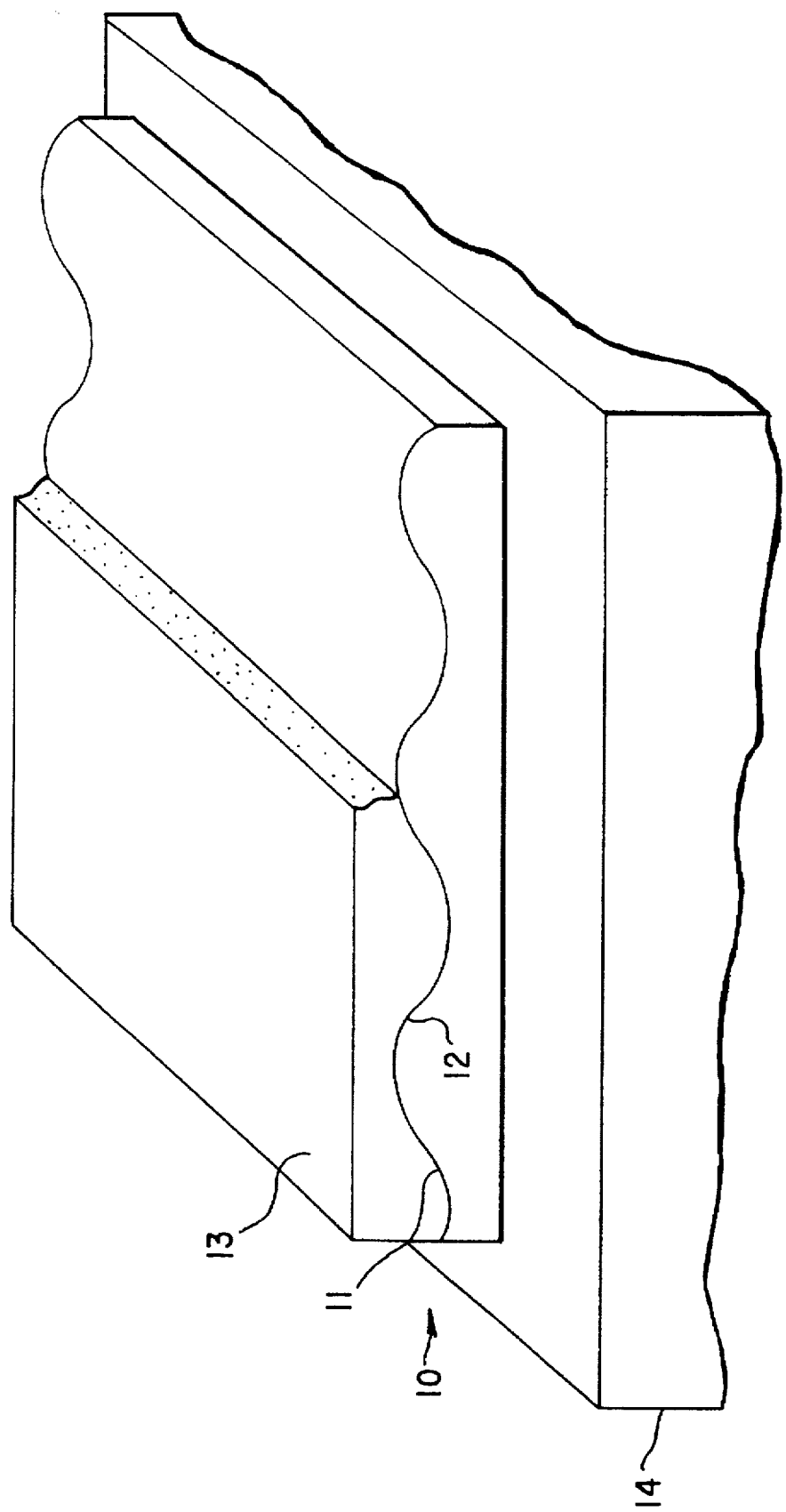

The proposed active foam 10 (used as the control sound source) is shown generally in FIG. 1. Induced strain actuators, such as PZT and PVDF, 11 generate in-plane motion when subjected to a voltage across their cross-sections. The in-plane motion can be transferred into out-of-plane motion when the actuators are curved as at 12. The out-of-plane motion activates the foam and results in more efficient radiation of sound. The instant actuator configuration utilizes this characteristic.

Four applications of the proposed distributed PVDF actuators are (i) active structural acoustic control, (ii) distributed speakers for special sound effects, (iii) active sound reflection control, and (iv) active damping isolator. A large piece of PVDF may be curved into a wave shape, such as that shown in FIG. 1, embedded in urethane foam 13 which, in turn, is then bonded to the surface of a vibrating structure, for example, a vibrating plate such as 14. The distributed PVDF actuator 11 can then be activated to generate a sound which has a 180° phase angle between the sound radiated from the plate in the near field. The near field acoustic interaction (or cancellation) will result in a reduction in the far-field acoustic pressure. The application of the distributed PVDF actuators as a special distributed speaker is manifested by applying very large curved PVDF sheets to a wall or laminating it in wallpaper to create very large thin speakers. The application of distributed PVDF actuators in active sound reflection control can be illustrated by considering an incident sound wave to a flat surface covered with curved PVDF films. First, the PVDF has a much lower structural impedance which tends to reduce the sound reflection; and second, the activation of the curved PVDF will generate a sound to cancel the reflected sound wave resulting in little or no sound reflection, also called an electronic sound absorber by Warnaka (1982).

The induced strain actuators which can be utilized in the ASAC applications include PZT, PVDF, and electrostrictive actuators. All these actuator materials can be used to generate in-plane motions as a function of applied voltage. The following equation holds for all the actuators mentioned above and can be used to optimize the curved PVDF shapes for embedding in the foam $$\epsilon_{in} = d_{31} \frac{V}{h} \quad (1)$$

where V is the applied voltage, h the thickness of the actuators, and $d_{31}$ material constant related to the poling characteristics of the actuators. Many papers have been published on these induced strain actuators such as by Pennwalt Co., 1989 and Buchanan, 1985.

Current application of these actuators in active acoustic control is basically a structural approach. Actuators, such as PZT, are mounted on a structure or embedded into a composite as a control excitation source. The actuator will excite a vibration to cancel the structural vibration caused by external loading resulting in an overall reduction in the vibration of the structure, and consequently in the overall sound radiation from the structure. PVDF is now often used as a dynamic sensor material in active structural acoustic control. Some researchers are using it as a structural actuator, such as the PZT actuator, in active structural vibration control (Alberts and Colvin, 1991). However, it has been generally believed that PVDF lacks the necessary structural impedance to be used in structural vibration control of structures with stiffness generally focused on realistic structures. It is necessary to note that the PVDF actuators discussed herein interact with a light fluid, such as air, not a stiffer solid, such as steel plates. Finally, we should state that PVDF is used as distributed (acoustic) actuators in ASA because PVDF is light, can be easily curved and attached to a structure, and, most importantly, is capable of radiating large sound levels in certain frequency ranges.

Optimized Curve Shape of PVDF Actuators

Figure 2:
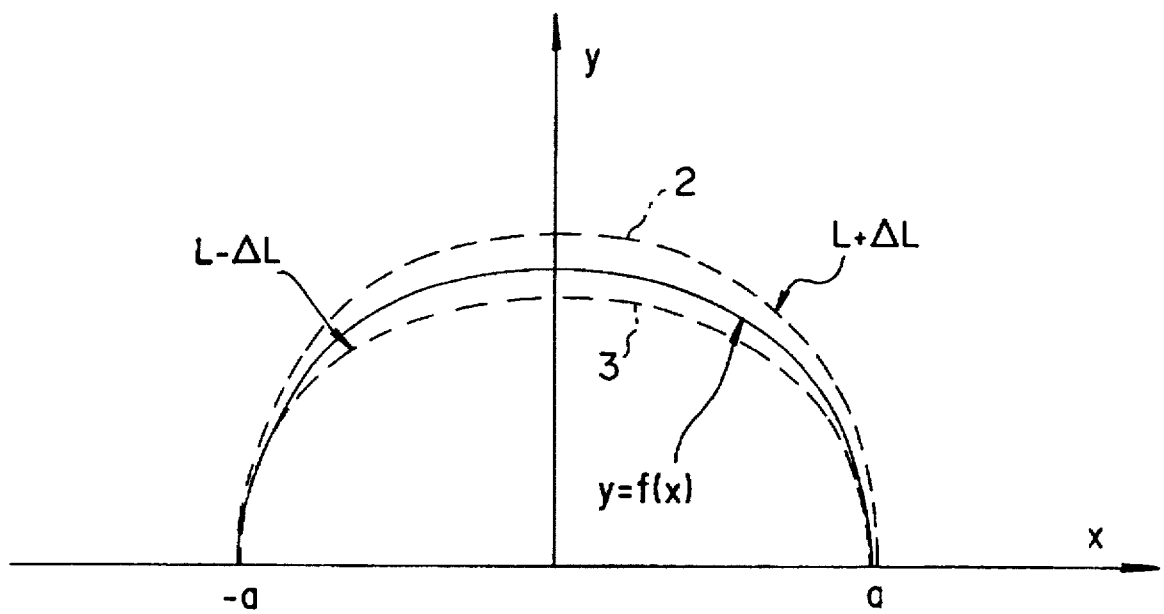

A piece of PVDF of length L is curved as shown in FIG. 2, the total deformation in the length direction is $\pm\Delta L$. The deformed shapes of the PVDF corresponding to $\pm\Delta L$ are curve 2 and 3 respectively as shown in FIG. 2. The most acoustically efficient curve should be the one corresponding to the largest area closed by curve 2 and 3. The area formed by curve 2 and 3 is $$S = \int_{-a}^{a} \frac{\Delta L}{L} R \sqrt{1 + \left(\frac{dy}{dx}\right)^2}\, dx \quad (2)$$

subjected to $$L = \int_{-a}^{a} \sqrt{1 + \left(\frac{dy}{dx}\right)^2}\, dx \quad (3)$$

where R is the radius of curvature of curve 1 (y=f(x)), and can be expressed as $$R = \frac{1}{y''\left[1+\left(\frac{dy}{dx}\right)^2\right]^{3/2}} \quad (4)$$

The above equations are highly nonlinear variational equations. Solving them is purely mathematical.

The most simple curved PVDF actuators are rings or cylinders. It is important to study the mechanism of sound radiation of such simple actuator configurations because it provides answers to essential questions, such as how much sound can be radiated from a curved PVDF actuator. What is the sound pressure distribution? and whether fluid coupling is necessary in the modeling. These questions are addressed as follows:

Modeling of PVDF Cylindrical Shells

The equation of motion for a cylindrical shell is given by $$\begin{cases} a\frac{\partial N_x}{\partial x} + \frac{\partial N_{x\phi}}{\partial \phi} + C\frac{\partial u}{\partial t} + pah\frac{\partial^2 u}{\partial t^2} = 0 \\ \frac{\partial N_\phi}{\partial \phi} + a\frac{\partial N_{x\phi}}{\partial x} + C\frac{\partial u}{\partial t} + pah\frac{\partial^2 u}{\partial t^2} = 0 \\ N_\phi + \frac{\partial^2 M_{\phi x}}{\partial x \partial \phi i} + a\frac{\partial^2 M_x}{\partial x^2} - \frac{\partial^2 M_{x\phi}}{\partial x \partial \phi} + \frac{1}{a}\frac{\partial^2 M_\phi}{\partial \phi^2} + qa + \\ C\frac{\partial \omega}{\partial t} + pah\frac{\partial \omega}{\partial t^2} = 0 \end{cases} \quad (5)$$

The in-plane forces are given by $$\begin{cases} N_x = \frac{Eh}{1-\mu^2}[\epsilon_x - \epsilon_{in} + \mu(\epsilon_\phi - \epsilon_{in})] \\ N_\phi = \frac{Eh}{1-\mu^2}[\epsilon_\phi - \epsilon_{in} + \mu(\epsilon_x - \epsilon_{in})] \\ N_{x\phi} = N_{\phi x} = \frac{hE}{2(1+\mu)}\gamma \end{cases} \quad (6)$$

where $\epsilon_{in}$ is the induced strain of the PVDF actuators as given from Equation (1). Writing Equation (5) in terms of displacement yields:

$$\begin{cases} \frac{\partial^2 u}{\partial x^2} + \frac{1-\mu}{2a^2}\frac{\partial^2 u}{\partial \phi^2} + \frac{1+\mu}{2a}\frac{\partial^2 v}{\partial x \partial \phi} - \frac{\mu}{a}\frac{\partial \omega}{\partial x} + \\ \overline{C}\frac{\partial u}{\partial t} + \overline{\rho}\frac{\partial^2 u}{\partial t^2} = 0 \\ \frac{1}{a^2}\frac{\partial^2 v}{\partial \phi^2} + \frac{1-\mu}{2}\frac{\partial^2 v}{\partial x^2} + \frac{1+\mu}{2a}\frac{\partial^2 u}{\partial x \partial \phi} - \frac{1}{a^2}\frac{\partial \omega}{\partial \phi} + \\ \overline{C}\frac{\partial v}{\partial t} + \overline{\rho}\frac{\partial^2 v}{\partial t^2} = 0 \\ \frac{1}{a^2}\frac{\partial v}{\partial \phi} + \frac{\mu}{a}\frac{\partial u}{\partial x} + \frac{h^2}{12}\left(\frac{\partial^4 \omega}{\partial x^4} + \frac{2}{a^2}\frac{\partial^4 \omega}{\partial x^2 \partial \phi^2} + \right. \\ \left. \frac{1}{a^4}\frac{\partial^4 \omega}{\partial \phi^4}\right) - \frac{\omega}{a^2} + \overline{C}\frac{\partial \omega}{\partial t} + \overline{\rho}\frac{\partial^2 \omega}{\partial t^2} = -\frac{1-\mu^2}{Eh}q + \frac{1-\mu}{a}\epsilon_{in} \end{cases} \quad (7)$$

where $\overline{\rho} = \rho(1-\mu^2)/E$ and $$\overline{C} = \frac{C}{ah}\frac{1-\mu^2}{E}.$$

The induced strain is introduced into the governing equation as a forcing term. The dynamic characteristics of the curved actuators and their dynamic response to induced strain can be analyzed using separation of variable (Timoshenko and Woinowsky-Krieger, 1959).

The steady state response of the PVDF cylindrical shell can be solved by assuming:

$$\begin{cases} \epsilon_{in} = \overline{\epsilon}_{in}\exp(i\omega t) \\ q = \overline{q}\exp(i\omega t) \end{cases} \quad (8)$$

and subsequently the displacement u, v, and w can be expressed as $$\begin{cases} u = \overline{u}\exp(i\omega t) \\ v = \overline{v}\exp(i\omega t) \\ \omega = \overline{\omega}\exp(i\omega t) \end{cases} \quad (9)$$

For simply-supported boundary condition, the following assumed functions satisfy both the natural and geometric boundary conditions.

$$\begin{cases} \bar{u} = \sum_{n=1}^{\infty} \sum_{m=1}^{\infty} A_{mn} \sin\frac{n\pi\phi}{\alpha} \cos\frac{m\pi x}{L} \\ \bar{v} = \sum_{n=1}^{\infty} \sum_{m=1}^{\infty} B_{mn} \cos\frac{n\pi\phi}{\alpha} \sin\frac{m\pi x}{L} \\ \bar{\omega} = \sum_{n=1}^{\infty} \sum_{m=1}^{\infty} C_{mn} \sin\frac{n\pi\phi}{\alpha} \sin\frac{m\pi x}{L} \end{cases} \quad (10)$$

The pressure and induced-strain may also be written as $$\begin{cases} \bar{q} = \sum_{n=1}^{\infty} \sum_{m=1}^{\infty} D_{mn} \sin\frac{n\pi\phi}{\alpha} \sin\frac{m\pi x}{L} \\ \bar{\epsilon}_{in} = \sum_{n=1}^{\infty} \sum_{m=1}^{\infty} E_{mn} \sin\frac{n\pi\phi}{\alpha} \sin\frac{m\pi x}{L} \end{cases} \quad (11)$$

where $D_{mn}$ and $E_{mn}$ are given by $$Dmn = \frac{4}{L\alpha} \int_0^L \int_0^\alpha q \sin\frac{n\pi\phi}{\alpha} \sin\frac{m\pi x}{L} d\phi dx \quad (12)$$

and $$Emn = \frac{4}{L\alpha} \int_0^L \int_0^\alpha \bar{\epsilon} \sin\frac{n\pi\phi}{\alpha} \sin\frac{m\pi x}{L} d\phi dx \quad (13)$$

The weighting coefficients $A_{mn}$, $B_{mn}$, and $D_{mn}$ can be solved from $$(\{K\}+i\omega\bar{C}\{I\}-\omega^2\bar{\rho}\{I\})\{X\}=\{F\} \quad (14)$$

where $$\{X\} = \{A_{mn}\ B_{mn}\ C_{mn}\}^T \quad (15)$$

$$\{K\} = \begin{cases} \left(\frac{m\pi}{L}\right)^2 + \left(\frac{n\pi}{\alpha}\right)^2 \frac{1-\mu}{2\alpha^2} & \frac{1+\mu}{2\alpha} \frac{mn\pi^2}{L\alpha} & \frac{\mu}{\alpha} m\pi L \\ \cdots & \frac{1}{\alpha^2}\left(\frac{n\pi}{\alpha}\right)^2 + \frac{1-\mu}{2}\left(\frac{m\pi}{L}\right)^2 & \frac{1}{\alpha^2} \frac{n\pi}{\alpha} \\ \text{symmetric} & \cdots & \frac{1}{\alpha^2} + \frac{\pi^4 h^2}{12\alpha^4}\left[\left(\frac{m\alpha}{L}\right)^2 + \left(\frac{n}{\alpha}\right)^2\right]^2 \end{cases} \quad (16)$$

and $$\{F\} = \left\{ 00 \frac{1-\mu}{\alpha} E_{mn} - \frac{1-\mu^2}{Eh} D_{mn} \right\}^T \quad (17)$$

where {I} is the unit matrix and superscript 'T' represents matrix transformation.

The eigenvalues and eigenvectors of the curved actuators can be resolved from Equation (14) by assuming $\bar{C}$ and {F} zero. Three eigenvalues and eigenvectors corresponding to one (m,n) set can be found because of the coupling between the radial, axial, and circumferential modes (Junger and Feit, 1986).

Fluid Coupled Acoustic Analysis

Since PVDF is extremely flexible (thin and low stiffness), a fluid coupled analysis is necessary even if the acoustic medium is air. In this case, the q in Equation (7) is the acoustic pressure acting on the actuators which can be solved from the acoustic wave equation. In order to simplify our analysis, an infinite PVDF cylinder is assumed. The traveling waves in the axial direction are not considered. For a thin and infinite PVDF cylinder, the governing equation can be simplified from Equation (7) as $$-\frac{\bar{\omega}}{\alpha^2} + \bar{C}i\omega\bar{\omega} + \bar{\rho}\omega^2\bar{\omega} = -\frac{1-\mu^2}{Eh}(P_o+P_i) + \frac{1-\mu}{\alpha}\bar{\epsilon}_{in} \quad (18)$$

The acoustic wave equation is $$\nabla\Phi = \frac{1}{C_f^2}\frac{\partial^2\Phi}{\partial t^2} \quad (19)$$

where $c_f$ is the sound speed in the fluid. Assuming $$\Phi = \Psi e^{i\omega t} \quad (20)$$

yields the Helmholtz equation given by $$\nabla\Psi + \lambda^2\Psi = 0 \quad (21)$$

where $$\lambda = \frac{\omega}{c_f} \quad (22)$$

Assuming $$\Psi = \sum_{n=0}^{\infty} A_n(\tau)\cos(n\phi) \quad (23)$$

The Helmholtz equation is now written as $$A_n''(\tau) + \frac{1}{\tau}A_n'(\tau) + \left(\lambda^2 - \frac{n}{\tau^2}\right)A_n(\tau) = 0 \quad (24)$$

The fundamental solution can be solved as $$A_n(\tau) = \begin{cases} B_n J_n(\lambda\tau)\tau \leq \alpha \\ C_n H_n(\lambda\tau)\tau \geq \alpha \end{cases} \quad (25)$$

where $J_n(\lambda\tau)$ is the Bessel function of the first kind and $H_n(\lambda\tau)$ the Hankel function of the first kind. The unknown integration coefficient $B_n$ and $C_n$ can be determined from the boundary condition which is $$\left(\frac{\partial\Phi}{\partial\tau}\right)\bigg|_{\tau=\alpha} = \frac{\partial\omega}{\partial t} = i\omega\bar{\omega}e^{i\omega t} \quad (26)$$

For an infinite length cylinder, the radial displacement and induced strain can be assumed to have the following form if the axial traveling wave is not considered.

$$\bar{\omega} = \sum_{n=0}^{\infty} \bar{\omega}_n \cos(n\phi) \quad (27)$$

and $$\bar{\epsilon}_{in} = \sum_{n=0}^{\infty} \bar{\epsilon}_n \cos(n\phi) \quad (28)$$

The integration coefficients in Equation (25) can then be determined as $$\begin{cases} C_n = \dfrac{\omega i \bar{\omega}_n}{\lambda J_n'(\lambda \alpha)} \\ B_n = \dfrac{\omega i \bar{\omega}_n}{\lambda H_n'(\lambda \alpha)} \end{cases} \quad (29)$$

The wave function, $\Psi$, can then be determined as $$\Psi = \begin{cases} \dfrac{i\omega}{\lambda} \sum_{n=0}^{\infty} \dfrac{J_n(\lambda\tau)}{J_n'(\lambda a)} \bar{\omega}_n \cos(n\phi) \tau \leq a \\ \dfrac{i\omega}{\lambda} \sum_{n=0}^{\infty} \dfrac{H_n(\lambda\tau)}{H_n'(\lambda a)} \bar{\omega}_n \cos(n\phi) \tau \geq a \end{cases} \quad (30)$$

The acoustic pressure can be derived from the wave function as $$P(r,t) = p(r) e^{i\omega t} = -\rho_f \dfrac{\partial \Phi}{\partial t} \quad (31)$$

or $$p(\tau) = -i\omega \rho_f \Psi \quad (32)$$

where $\rho_f$ is the density of undisturbed acoustic medium. The inside and outside acoustic pressure may then be written as $$\begin{cases} p_i(\tau) = \dfrac{\rho_f \omega^2}{\lambda} \sum_{n=0}^{\infty} \dfrac{J_n(\lambda\tau)}{J_n'(\lambda a)} \bar{\omega}_n \cos(n\phi) \\ p_o(\tau) = \dfrac{\rho_f \omega^2}{\lambda} \sum_{n=1}^{\infty} \dfrac{H_n(\lambda\tau)}{H_n'(\lambda a)} \bar{\omega}_n \cos(n\phi) \end{cases} \quad (33)$$

The acoustic pressures acting on the PVDF cylinder can be solved from Equation (33) and then substituted into Equation (18), yielding:

$$\bar{\omega}_n = \dfrac{1-\mu}{a} \bar{\epsilon}_n / \left[ \bar{\rho}\omega^2 + \bar{C}i\omega - \dfrac{1}{a^2} + \dfrac{\rho_f \omega^2}{\lambda} \dfrac{1-\mu^2}{Eh} \left( \dfrac{J_n(\lambda a)}{J_n'(\lambda a)} + \dfrac{H_n(\lambda a)}{H_n'(\lambda a)} \right) \right] \quad (34)$$

The displacement coefficients, $\bar{\omega}_n$ given by Equation (34) can be substituted back to Equation (33) to calculate the acoustic pressure. The equations derived above can be used to calculate sound radiations of cylinders with integrated induced strain actuators, such as a cylinder with discretized PZT patches mounted on its surface. If the entire structure is made of an induced strain material, such as the PVDF cylinder discussed here, only the first term in Equation (28) is not zero. This indicates only the first mode (uniform radial expansion and contraction mode) can be excited, i.e., only the first term of all the summation is not zero. The amplitude of radial displacement of a PVDF cylinder, thus, can be expressed as $$\bar{\omega}_0 = \dfrac{1-\mu}{a} \bar{\epsilon}_{in} / \left[ \bar{\rho}\omega^2 + \bar{C}i\omega - \dfrac{1}{a^2} + \dfrac{\rho_f \omega^2}{\lambda} \dfrac{1-\mu^2}{Eh} \left( \dfrac{J_0(\lambda a)}{J_0'(\lambda a)} + \dfrac{H_0(\lambda a)}{H_0'(\lambda a)} \right) \right] \quad (35)$$

The resonant frequency of the thin PVDF cylinder can be determined from Equation (35) as $$\omega_R = \dfrac{1}{a} \sqrt{\dfrac{E}{\rho(1-\mu^2)}} \quad (36)$$

Once the acoustic pressure is determined from Equation (33), the particle velocity (radial direction) outside the cylinder can be solved from $$v_\tau = \dfrac{1}{i\omega \rho_f} \dfrac{dp_o}{d\tau} \quad (37)$$

The time average acoustic intensity is defined as $$I(\tau) = \dfrac{1}{2} Re[p_o * conj(v_\tau)] \quad (38)$$

where "conj" denotes complex conjugate and "Re" denotes the real part of the complex number. The acoustic intensity can then be expressed explicitly as $$I(\tau) = -\frac{1}{2} \frac{\rho_f \omega^3}{\lambda} Re \left[ \frac{H_0(\lambda\tau)}{H_0'(\lambda a)} * conj\left(\frac{iH_0'(\lambda\tau)}{H_0'(\lambda a)}\right) \overline{\omega}_0 * conj(\overline{\omega}_0) \right] \quad (39)$$

The variables in the acoustic intensity are the voltage applied to the PVDF, the radius and thickness of the actuator, and the activation frequency.

Results and Analysis

Listed in Table 1 are the material properties of the PVDF cylinders modeled in this paper. This PVDF is commercially available. A constant voltage of 110 volts is assumed to be applied to the actuator. The acoustic pressure or intensity is measured at one meter from the cylinder. The thickness of the PVDF cylinder is assumed to be 110 µm unless otherwise specified. The loss factor is given as 0.018. Damping is added in the model by assuming a complex modulus which is $E(1+i \tan \delta)$ while the damping coefficient, C, in Equation (18) is assumed to be zero.

Reducing the thickness of PVDF cylinders does not alter their resonant frequencies (see Equation (36)). This can be seen from FIG. 7 where the frequencies of the first peak of the two curves remain almost the same (their difference is caused by damping and fluid coupling). The frequencies of the second peak, however, differ by about 1,000 Hz as a result of increasing the fluid coupling if the structural impedance of the PVDF cylinder decreases. Except around the resonant frequency, the thickness of PVDF cylinders affects their acoustic behavior almost the same way as changing the voltage (see Equation (1)).

An experiment was conducted to demonstrate the effectiveness of curved PVDF actuators as a sound source. A piece of PVDF of 0.16×0.02 meter was curved into a ring (radius=0.025 m) and hung on a small bracket. AC voltage was applied to the actuator. The sound level was measured

TABLE 1

Material Properties for the PVDF Actuators

| $d_{31}, \left(\frac{m/m}{V/m}\right)$ | E, (N/m²) | ρ, (kg/m³) | tan ∂ | Max. Voltage (V/m) |
|---|---|---|---|---|
| $23 \times 10^{-12}$ | $2 \times 10^9$ | 1780 | 0.018 @ 10 kHz | $30 \times 10^6$ |

Figure 3:
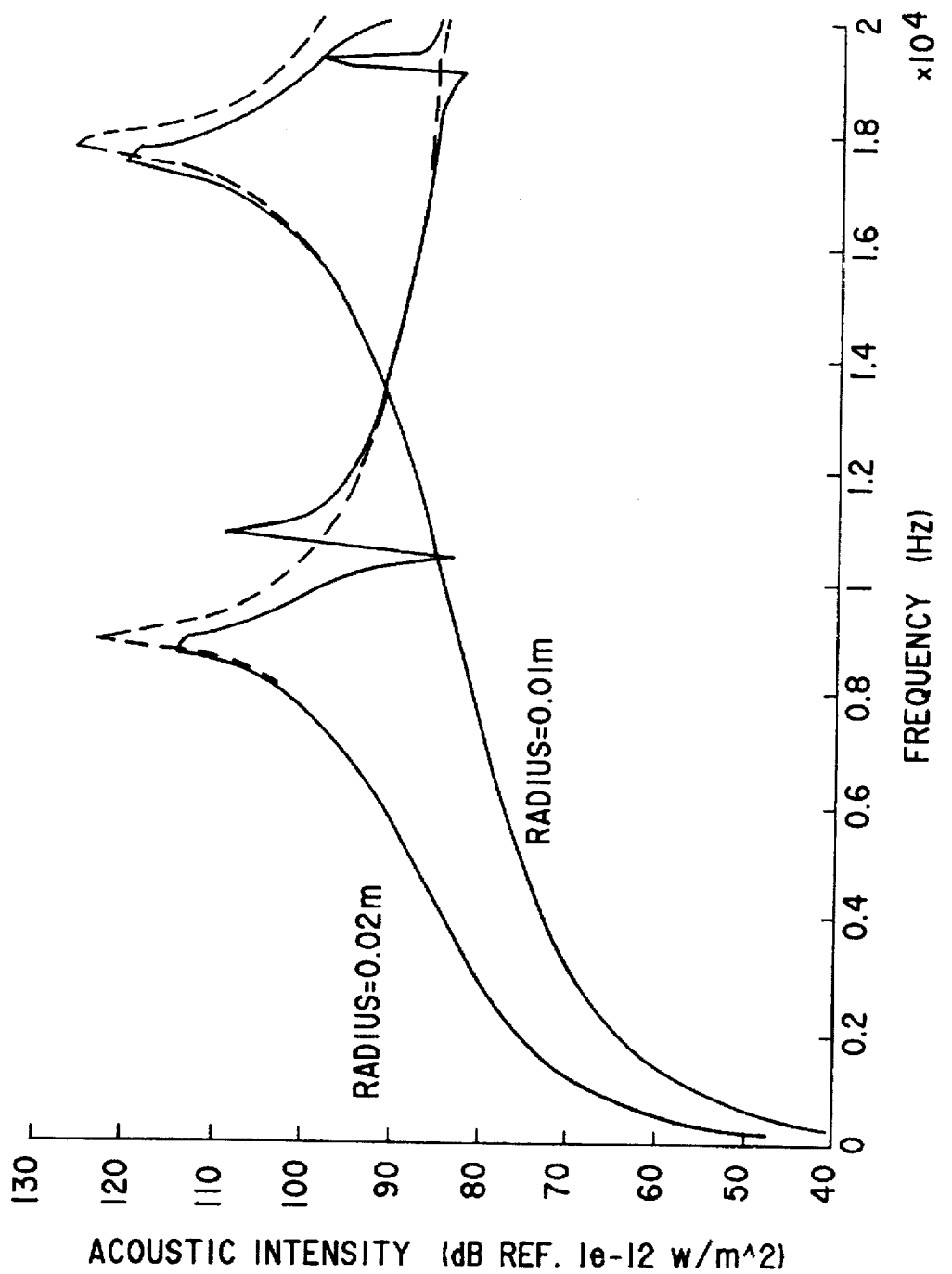

Shown in FIG. 3 is the acoustic intensity as a function of frequency. The solid lines are from coupled analysis where the influence of fluid loading is considered. The dashed lines are from de-coupled analysis, where fluid interaction is not considered. Only one peak can be found if the analysis is based on no fluid coupling because the PVDF cylinder has only one resonant frequency as given by Equation (36). For the first PVDF cylinder (radius=0.02 m) its resonant frequency is about 8.8 kHz as can be seen from both coupled and decoupled analysis. The second and third peak (at 11 kHz and 19 kHz) calculated based on coupled analysis are obviously due to the fluid coupling. The de-coupled analysis agrees with the coupled analysis very well except around resonant frequencies. The second PVDF cylinder simulated has a radius of 0.01 m and its resonant frequency is around 17.5 Hz. The results from de-coupled analysis fit well below the resonant frequency. One important conclusion can be drawn from the above analysis: if the radius of curvature of the curved PVDF actuator is less than 0.0088 m (or 0.35 inch), it is not necessary to consider the fluid interaction with the actuator in the audio frequency range (20 to 20,000 Hz).

Figure 4:
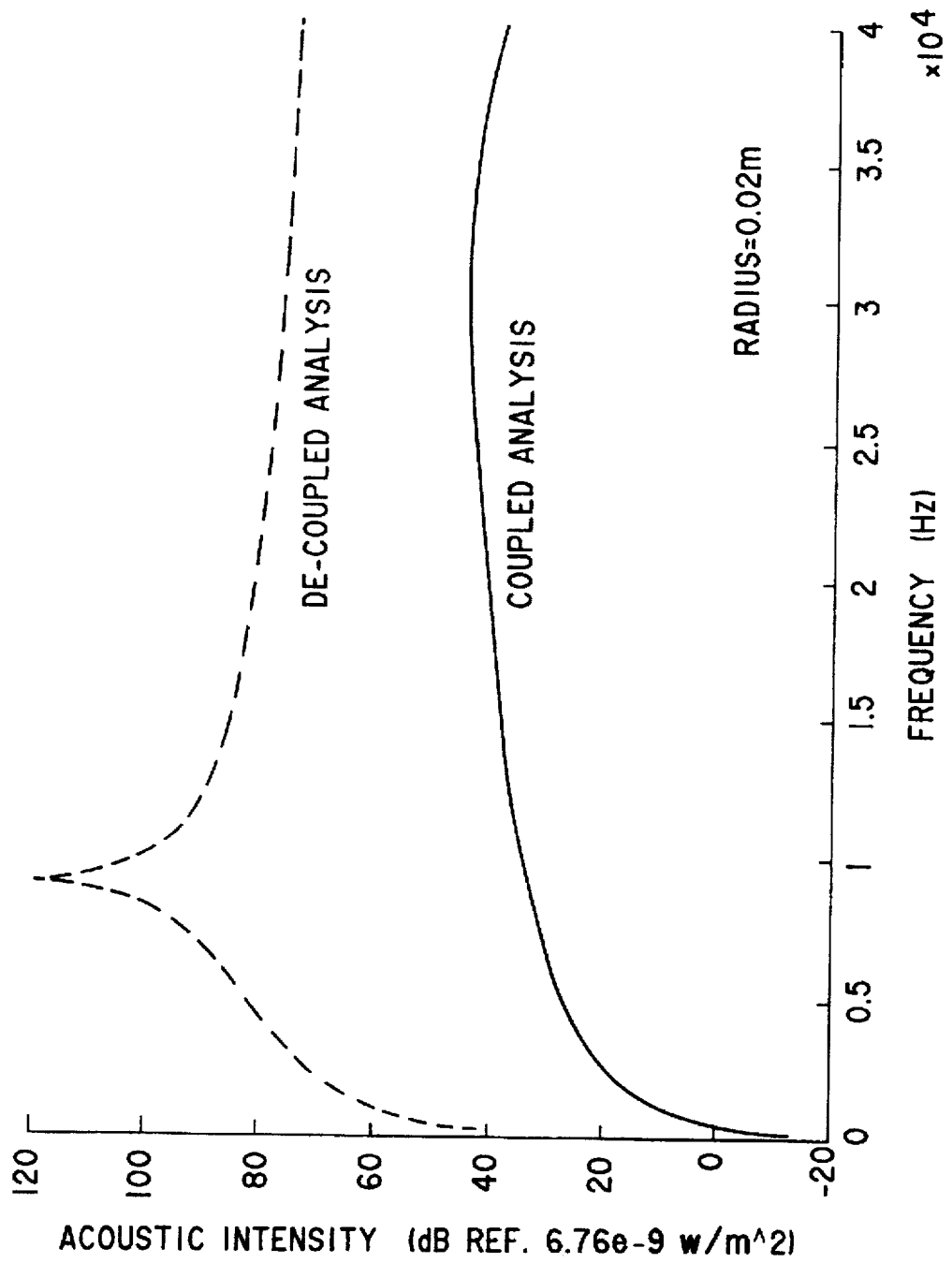

The application of such devices in under water ASAC has also been investigated and the simulated results are shown in FIG. 4. Fluid-coupled analysis is definitely required. The result shows that the PVDF actuator has a relatively flat response range, and its resonant frequency is pushed far away from the audio frequency range.

Figure 5:
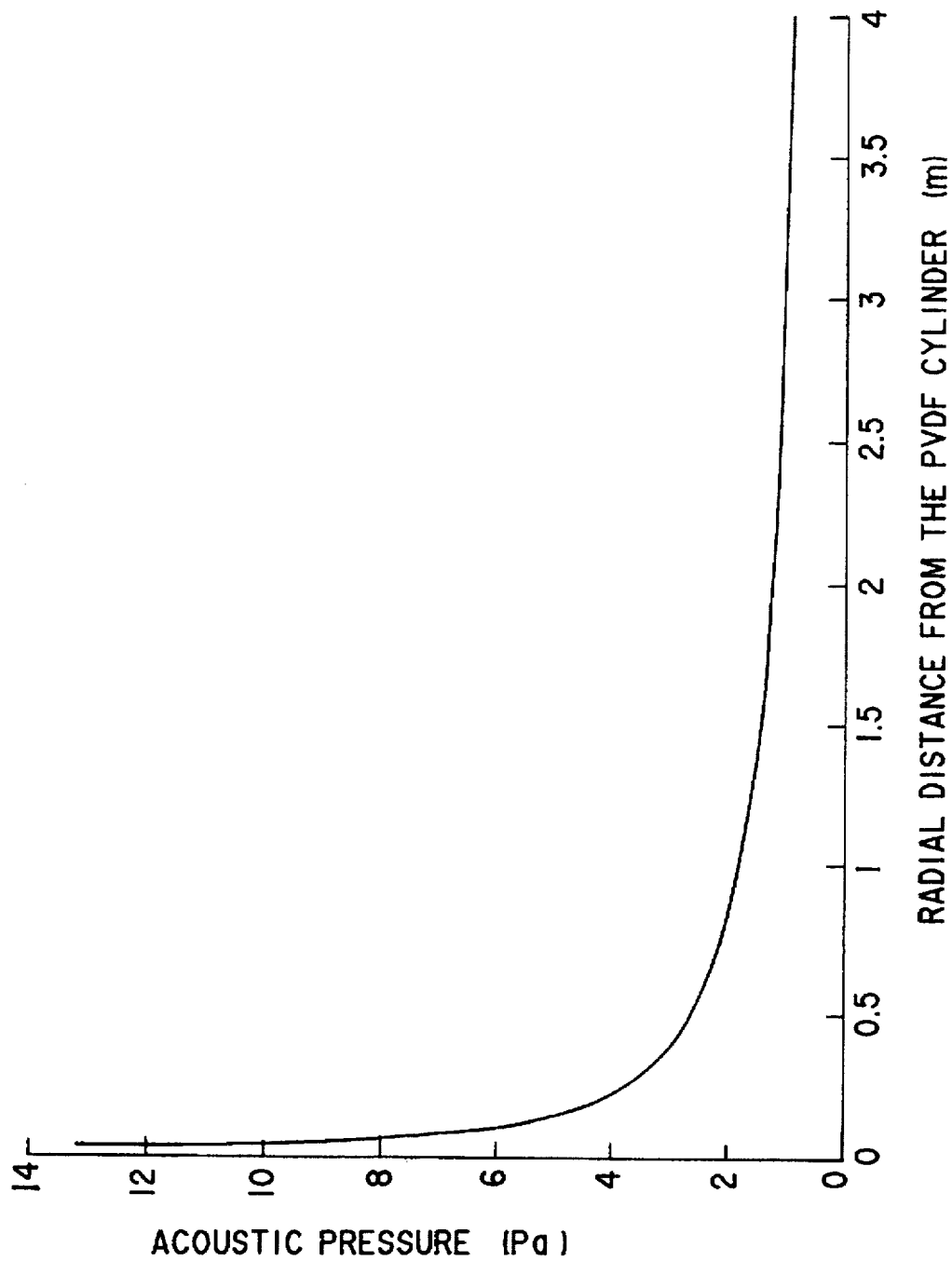
Figure 6:
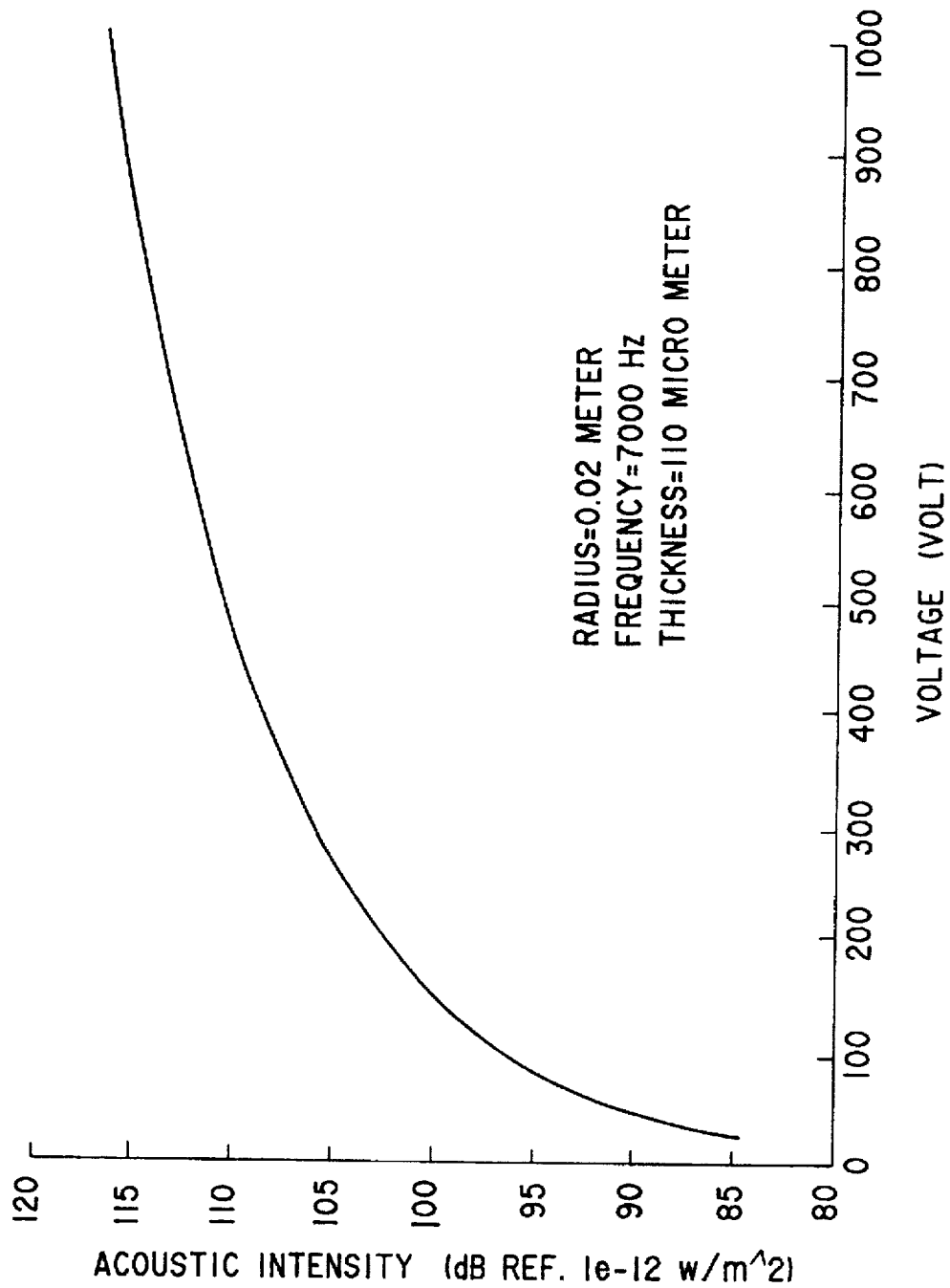

Shown in FIG. 5 is the acoustic pressure amplitude as a function of radial distance from the cylinder. The outside acoustic pressure acting on the PVDF cylinder is about 13 Pa. Shown in FIG. 6 is the acoustic intensity measured at one meter from a PVDF actuator as a function of applied voltage. Extremely high voltage can cause arcing and resistance heating even though the electric impedance of PVDF appears to be very high.

Figure 7:
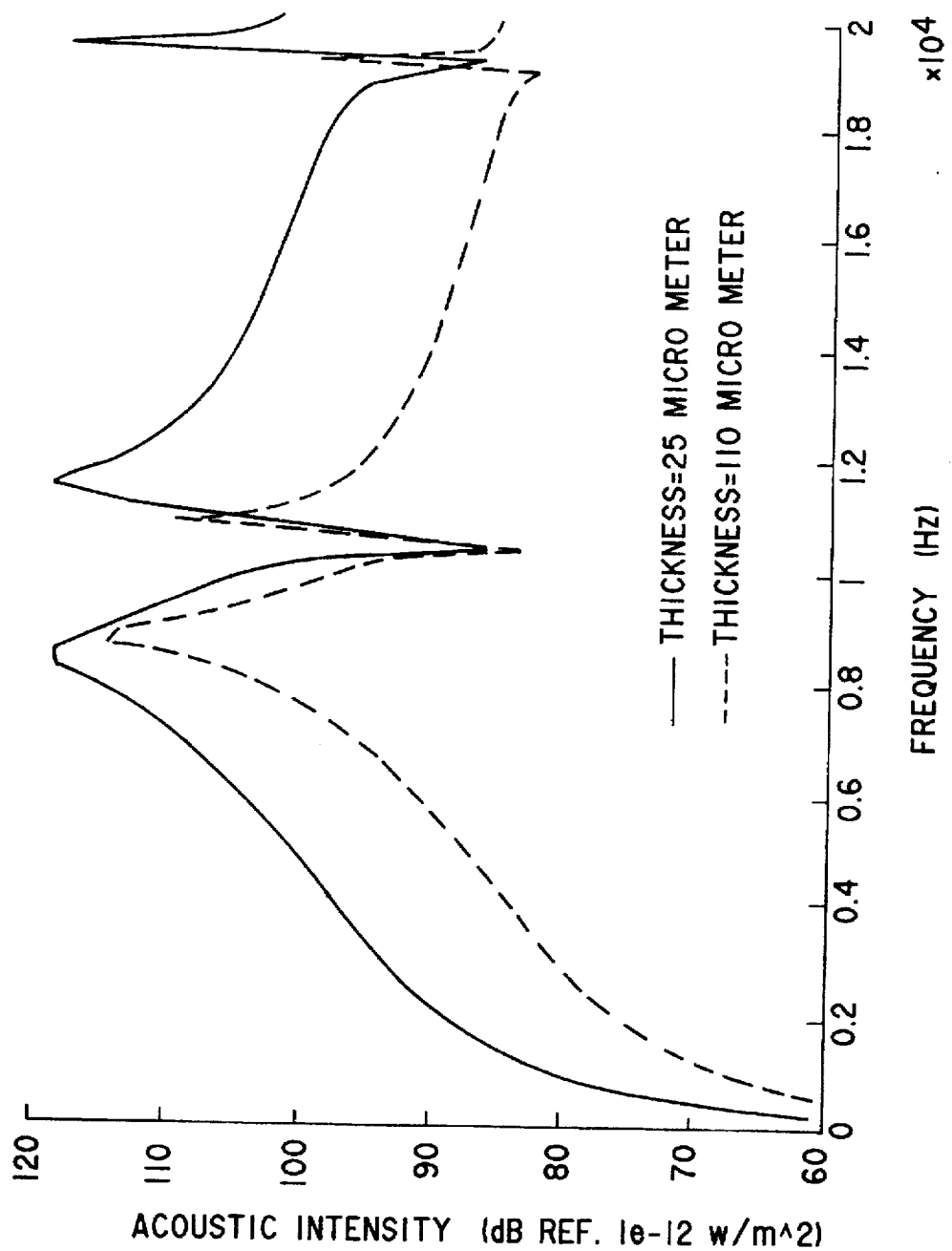
Figure 8:
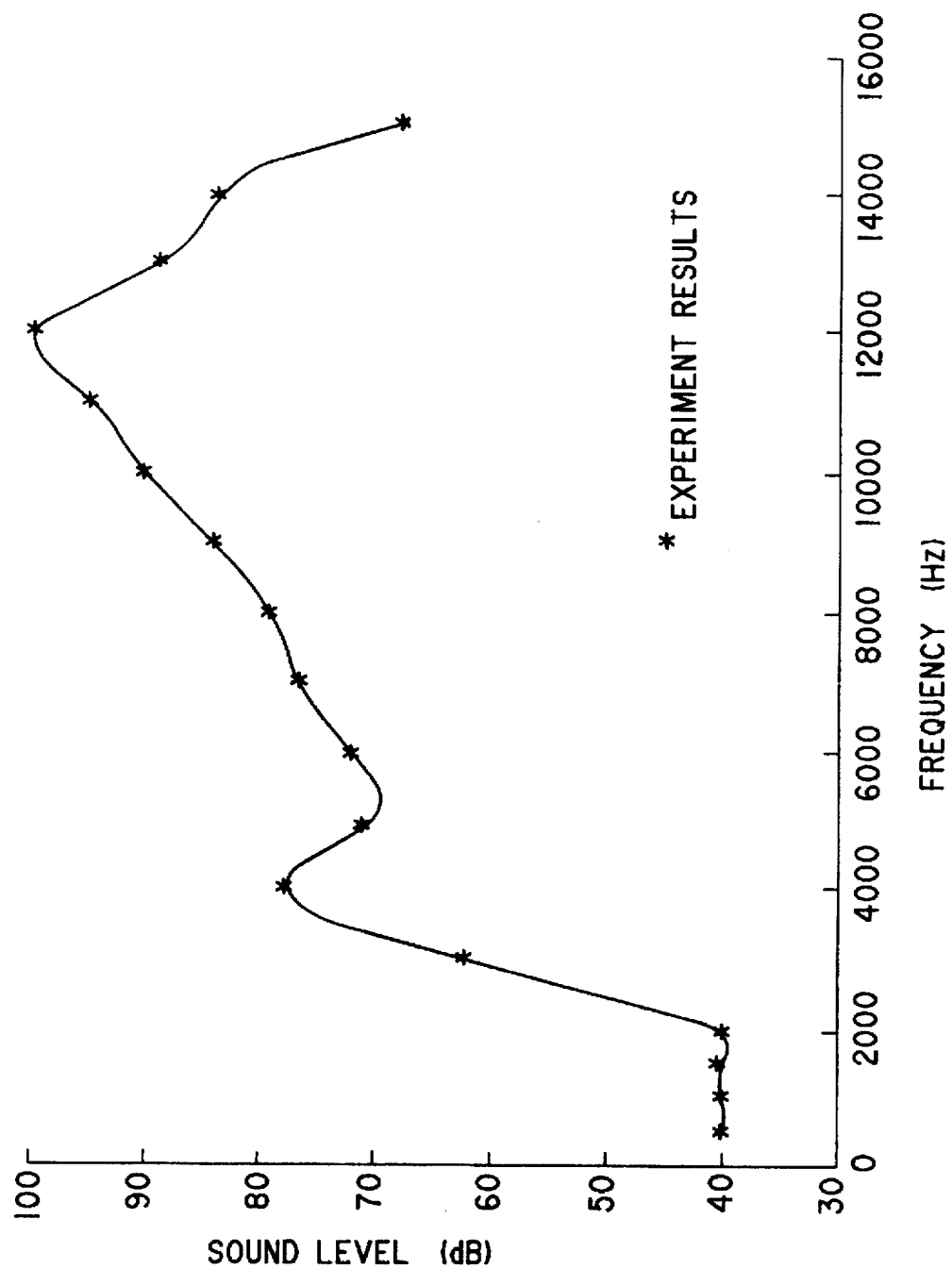

Shown in FIG. 7 is the coupled analysis of two PVDF cylinders of the same radius (0.02 m) but different thickness.

at one meter from the PVDF ring as a function of frequency and applied voltage. The thickness of the PVDF is 28 µm. Note that the piece of PVDF used in this experiment was designed to be used as sensors, and had a plastic shield, which tended to reduce the amount of induced strain. However, the plastic shield can increase the stiffness of the ring. Detailed analysis is needed to study whether applying the plastic shield will decrease or increase the sound radiation efficiency of curved PVDF actuators. The open circuit voltage applied across the cross-section of the PVDF ring was 100 volts. The sound level as a function of frequency is plotted in FIG. 8. The first sound level peak is observed at 4 kHz and the sound level is 78 dB. This corresponds to the resonant frequency of the ring. The second peak occurs at 12 kHz and the sound level reaches as high as 100 dB. The PVDF ring does not respond below 2,000 Hz which will limit the application of such devices. However, the response of a curved PVDF actuator largely relies on its configuration. For example, if the radius of the ring increases so that its first resonant frequency is at 2,000 Hz, the frequency response of the PVDF ring below 2,000 Hz may be improved.

Figure 9:
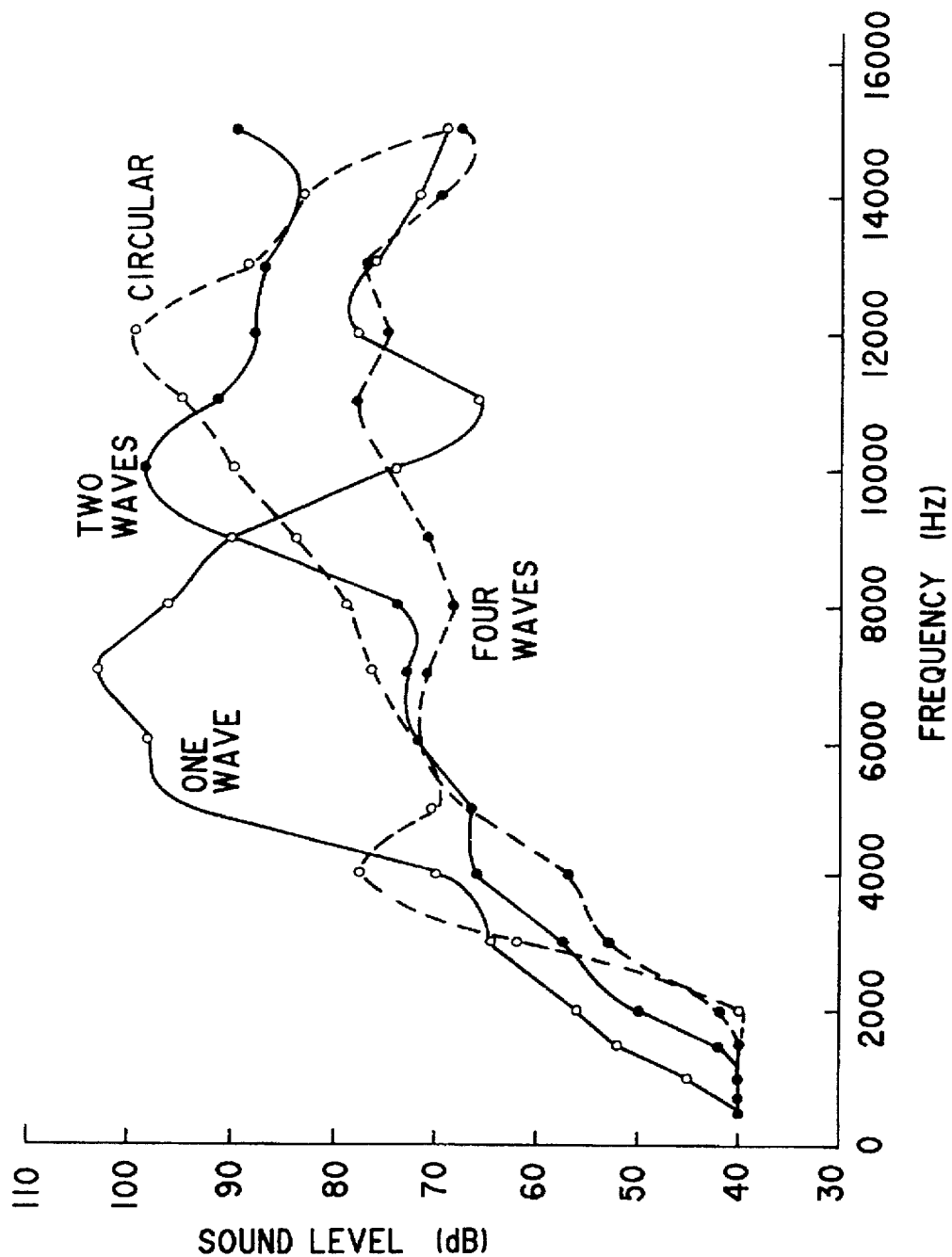

It has been found that the sensor-type PVDF has much more authority in radiating sound than the plain PVDF actuators. The thickness of the plain PVDF is about 50 micrometers, while the thickness of the sensor-type PVDF is only about 28 micrometers. The thickness of the plastic layer for the sensor-type PVDF is about 86 micrometers (the total thickness of the sensor-type PVDF is about 200 micrometers.). Although the amount of induced strain, at the same voltage as applied to a plain PVDF actuator, of a sensor-type PVDF may be reduced due to the constraint of plastic layers, the structural impedance of the actuators has been increased, resulting in more sound radiation. The maximum sound radiated from the plain PVDF actuator (at its resonant frequency and 100 volts) is about 75 dB. The sound radiated from the sensor-type PVDF actuators can be as high as 105 dB at the same voltage, as shown in FIG. 9.

FIG. 10 shows a configuration of active foam 50 having multiple layers of flexible piezoelectric material 51, 52 embedded therein. Such foam can be used as both passive and active insulation for noise attenuation purposes.

FIG. 11 shows a sectional view of multiple layers of piezoelectric material 61, 62 being used in sound radiation/absorption control on a panel 60. Reflected or radiated waves 63 or reflected wave 64 can be controlled by adjusting the electrical inputs to the piezoelectric material. The piezoelectric material can be used as both actuators or sensors in conjunction with a suitable control algorithm such as that described in U.S. Pat. No. 5,091,953 to Tretter.

FIG. 12 shows a vibratory machine 70 mounted atop active foam 71 which has piezoelectric layers 72, 73 therein. The assembly is atop flexible base 74. Transmitted vibrations can be reduced by active electrical inputs into the piezoelectric material. The piezoelectric material can again be used either as an actuator or sensor in conjunction with a suitable control algorithm.

A preliminary investigation was conducted to investigate the feasibility of utilizing PVDF (acoustic) actuators in the form of the active foam in active sound attenuation techniques. Both experiments and theoretical analysis demonstrate the effectiveness of PVDF actuators as control sound sources. The coupled acoustic analysis shows that fluid coupled analysis (in the audio frequency range) is needed if the radius of curvature of a curved PVDF actuator is greater than 0.01 meter. Otherwise, de-coupled analysis can be applied. This will simplify the theoretical analysis of acoustic radiation of complex configuration, such as the one shown in FIG. 1. The theoretical model also provides useful tools for our further investigation of distributed PVDF actuators.

Figure 13:
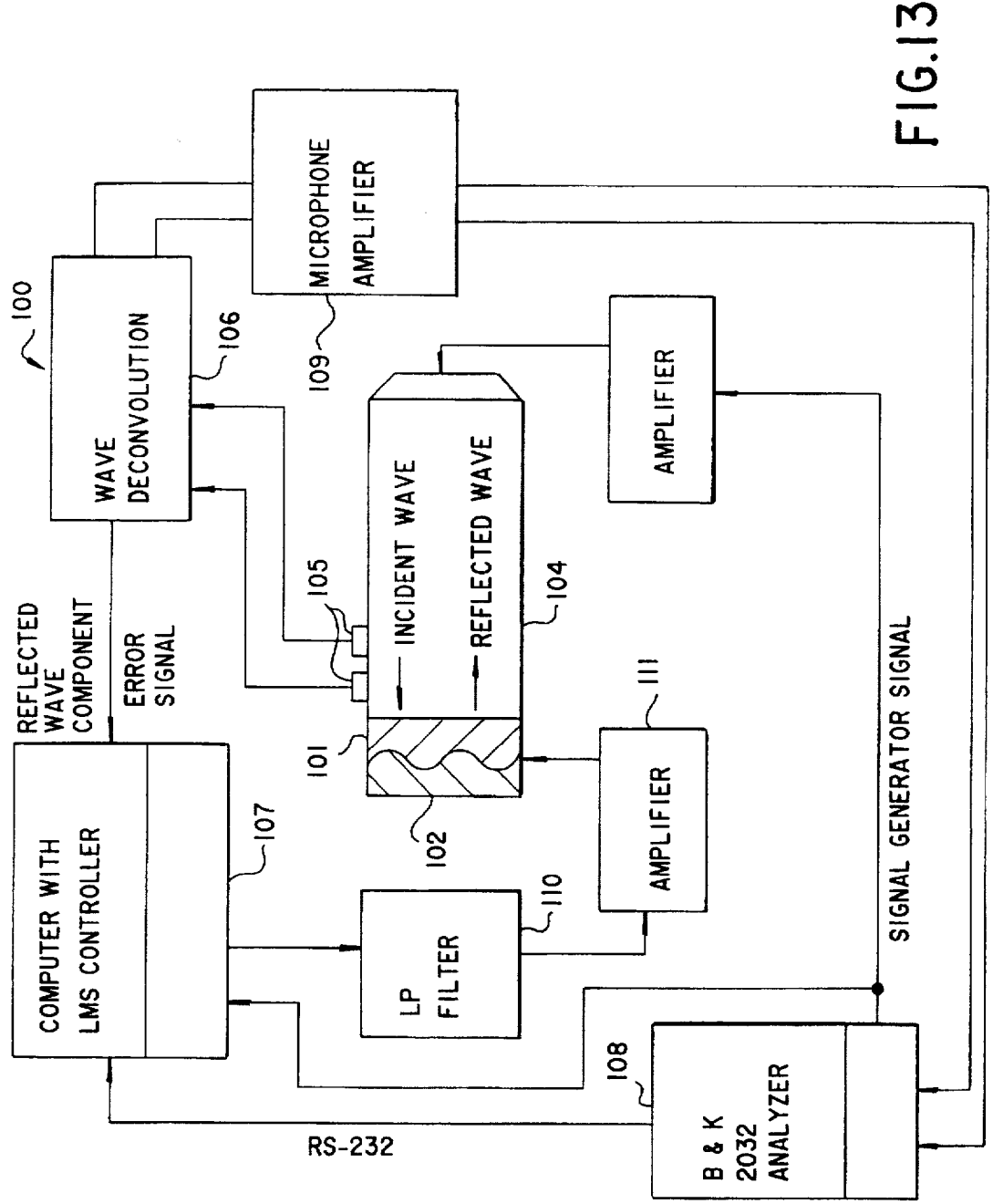
Figure 14:
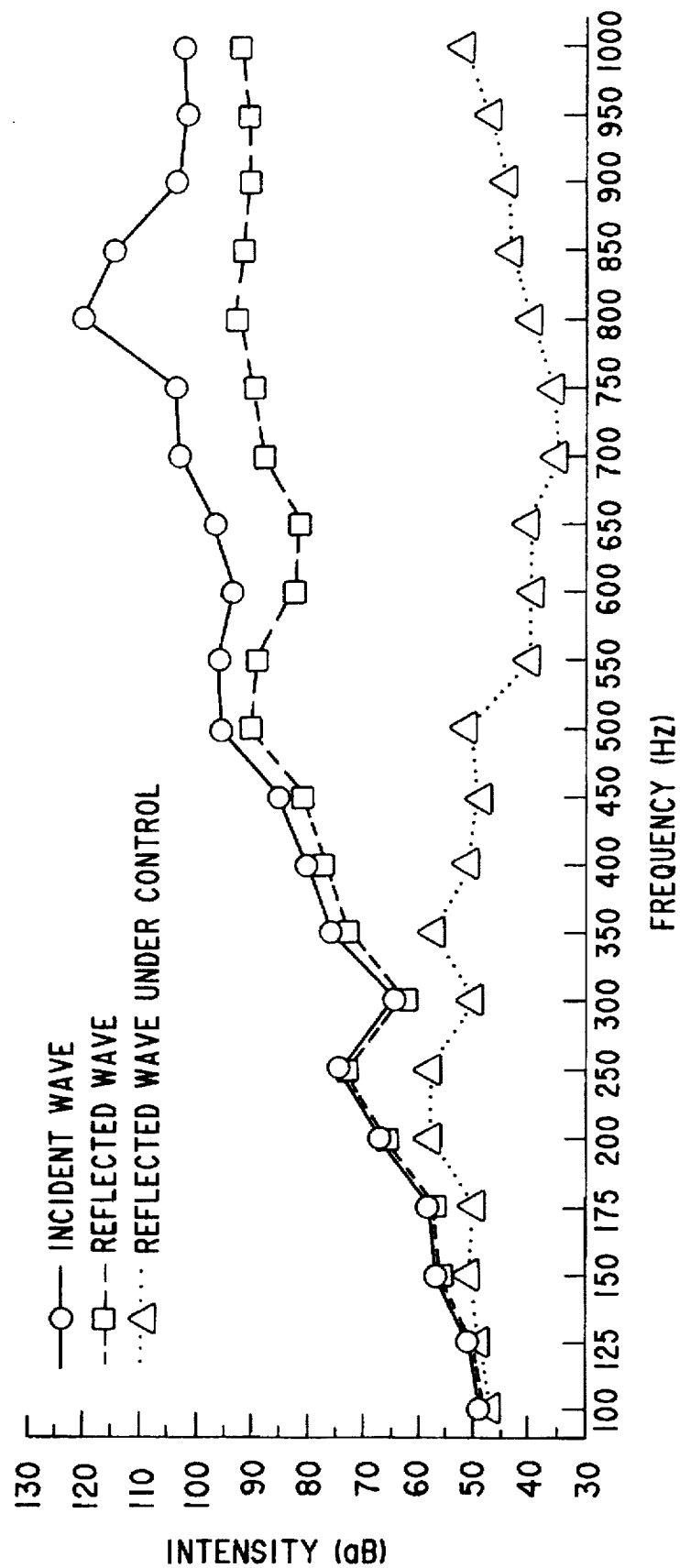

FIG. 13 is a block diagram showing a standing wave tube schematic of system 100. PVDF film 101 is embedded in a urethane foam structure 102 in various shapes and sizes. The PVDF shapes include sine waves, square waves and multi-layered configurations. A standing wave tube 104 is used to evaluate the sound absorption of the active composite foam. The incident and reflected waves are measured using two microphones 105 and an analog wave deconvolution circuit 106. A filtered-x LMS adaptive algorithm accomplishes through computer 107 harmonic control of the reflected wave component. A B&K analyzer checks the signals from circuit 106 which have been amplified through circuit 109. Control of the PVDF is accomplished by a signal from computer 107 passing through a low pass filter 110 and being amplified at 111 before activating the PVDF 101. The results of various tests are shown in FIG. 14 which shows the frequency response function of active foam comprising controlled and uncontrolled reflected wave intensity. Note the increase in control in the higher frequencies. The reduction of reflected noise is important to many areas of acoustics. It is desired to explore the use of new materials such as PVDF films in active control of reflected sound. Composites constructed of PVDF film embedded in urethane foam provide effective attenuators even at low frequencies where passive techniques are limited. The results show much higher absorption of sound than just convention foam. This sound reduction can be achieved with a very thin film of material.

Figure 15:
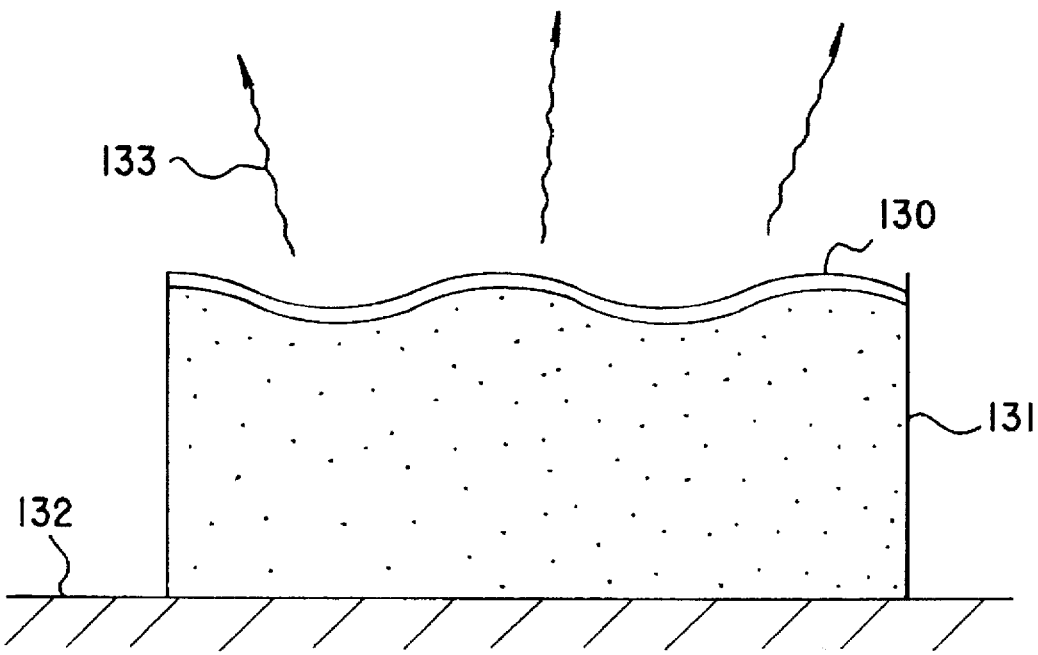

FIG. 15 shows the instant invention being used as a speaker with the PVDF film 130 supported by foam 131 mounted atop a supporting structure 132. In this configuration activation of the PVDF film causes the film to act as a speaker and radiate sound as at 133.

Figure 16:
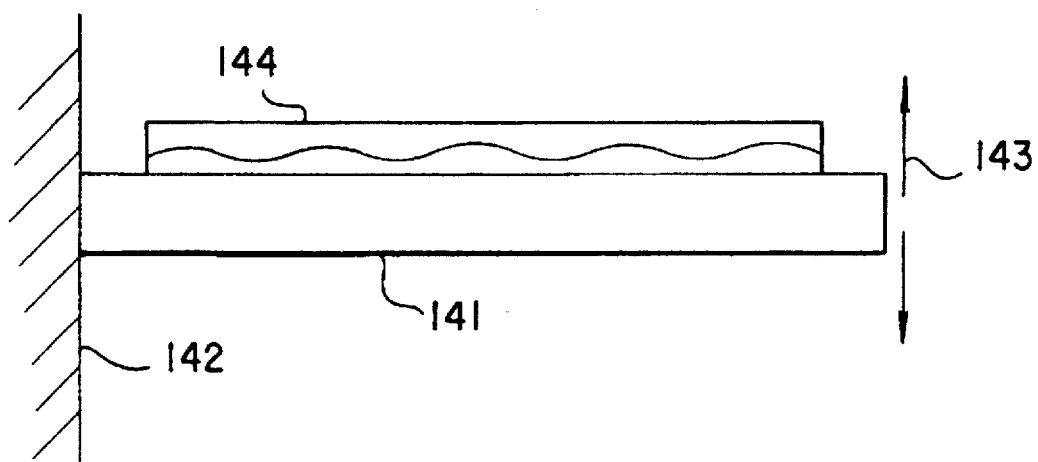

FIG. 16 illustrates the instant invention being used to control vibrational deflection of a beam 141 mounted to wall 142. Normally, vibration in the member causes deflection as at 143 in beam 141. By putting a length of active foam 144 along the length of the beam the deflection at 143 can be minimized through active damping. Foam 144 has a layer of PVDF 145 embedded therein.

The above examples show the foam can be used to actively create and control transverse motion. These attributes can be taken advantage of to create an active isolation strategy as in FIG. 12. The foam can also be similarly used to create active damping by appropriately adjusting the control inputs.

Having described the invention in terms of multiple preferred embodiments, those of ordinary skill in the art will recognize that the invention can be practiced with modification within the spirit and scope of the appended claims.

We claim:

1. An active foam system, said system comprising,
   a first foam means having a given width and length;
   a second foam means having a given width and length;
   an actuator means capable of producing sound, having a given width and length and having a plurality of alternating convex and concave curved adjacent sections in a sinusoidal shape along at least one of its axes wherein the plurality of alternating convex and concave curved adjacent sections move out-of-phase when an electrical potential is applied to the actuator means, embedded between a bottom surface of said first foam means and a top surface of said second foam means, wherein the bottom surface of said first foam means and the top surface of said second foam means have the same sinusoidal shape of said actuator means,
   wherein said foam means have acoustic and vibrational properties, and said actuator means is electrically activated by causing said actuator means to vibrate and couple to out-of-plane external motion in order to modify the acoustic and vibrational properties of said foam means, and wherein the given width and length of said first and second foam means approximate the width and length of said actuator means.

2. The system of claim 1 wherein the curvature of said actuator means, when activated electrically, radiates sound and causes said foam means to radiate sound.

3. A system as in claim 1 wherein the actuator means is a PVDF actuator.

4. A system as in claim 1 wherein the near-field acoustic interaction of said active foam system with an unwarranted noise or vibration field in the near-field results in a reduction in the far-field acoustic pressure.

5. A system as in claim 1 wherein said actuator means comprises a plurality of distributed speakers.

6. A system as in claim 1 wherein said actuator means has a lower structural impedance than the structural impedance of a sound radiating machine to which said second foam means is attached.

7. A system as in claim 1 wherein said actuator means generates out-of-plane motion when subjected to a voltage across a cross-section of said actuator means.

8. An active foam system as in claim 1 wherein said embedded actuator means is curved in such as way as to enhance the transverse displacement of said actuator means for a given electrical input across a cross-section of said actuator means.

9. An active speaker system for creating a desired sound, said system comprising

- a first layer of foam, a bottom surface of said first layer of foam being substantially planar and a top surface of said first layer being configured in a first wave form,
- a second layer of foam, a bottom surface of said second layer of foam being configured in a second wave form which matches the first wave form of said first layer of foam and a top surface of said second layer being substantially planar,
- an active film means embedded between the top surface of said first layer of foam and the bottom surface of said second layer of foam and having a third wave form which matches said first wave form and said second wave form, said active film means electrically activated to produce vibration, and
- a supporting means engaging the substantially planar bottom surface of said first layer of foam that restricts in-plane motion of the active film means, whereby said vibration of said active film means causes said active film means to act as a speaker due to the third wave form of the active film means whose shape is kept fixed by said active film means being embedded between said first layer of foam and said second layer of foam leading to out-of-plane motion of said active speaker system with attendant vibration and noise.

10. A system as in claim 9 wherein said active film means is PVDF film.

11. A system as in claim 9 wherein said foam layer is made of urethane.

12. An active system for creating vibration isolation, said system comprising

- a first layer of foam of a given length having a top surface, which is sinusoidally shaped, and a bottom surface;
- a second layer of foam of a given length having a top surface and a bottom surface which is sinusoidally shaped;
- a sinusoidally shaped active film means capable of producing sound, comprising a plurality of alternating convex and concave curved adjacent sections, embedded between the sinusoidally shaped top surface of said first layer of foam and the sinusoidally shaped bottom surface of said second layer of foam, which is electrically stimulated to produce out-of-plane motion in a direction transverse to an axis of said sinusoidally shaped active film means by applying an electrical potential to the sinusoidally shaped active film means to cause the convex curved sections to move out-of-phase to adjacent concave curved sections of the plurality of alternating convex and concave curved adjacent sections, wherein the sinusoidal shape of the top surface of said first layer of foam and the sinusoidal shape of the bottom surface of said second layer of foam matches the sinusoidal shape of said active film means; and
- an electrical controller means operatively connected to said active film means, said system able to be securely fastened to a vibrating structure and by action of said controller means to dampen the vibration of said vibrating structure.

13. A system as in claim 12 wherein said layer of foam is urethane.

14. A system as in claim 12 wherein said active film means is PVDF.

\* \* \* \* \*

UNITED STATES PATENT AND TRADEMARK OFFICE
CERTIFICATE OF CORRECTION

PATENT NO   : 5,719,945
DATED       : February 17, 1998
INVENTOR(S) : Fuller et al It is certified that error appears in the above-identified patent and that said Letters Patent are hereby corrected as shown below:

On the title page:   Item [73]

Assignee should read --Virginia Tech Intellectual Properties, Inc., Blacksburg, VA--
"Noise Cancellation Technologies, Inc., Linthicum, Md" should be deleted.

Signed and Sealed this

Seventeenth Day of April, 2001

Attest:

NICHOLAS P. GODICI

Attesting Officer

Acting Director of the United States Patent and Trademark Office